(12) United States Patent
Tamai et al.

(10) Patent No.: US 6,701,803 B1
(45) Date of Patent: Mar. 9, 2004

(54) REDUCTION GEARS-INTEGRATED ACTUATOR

(75) Inventors: Masafumi Tamai, Kitakyushu (JP); Yasuhiro Miyamoto, Kitakyushu (JP); Mayumi Umetsu, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/089,062

(22) PCT Filed: Oct. 5, 2000

(86) PCT No.: PCT/JP00/06966

§ 371 (c)(1), (2), (4) Date: Apr. 5, 2002

(87) PCT Pub. No.: WO01/26203

PCT Pub. Date: Apr. 12, 2001

(30) Foreign Application Priority Data

Oct. 5, 1999  (JP) .......................................... 11-284400

(51) Int. Cl.⁷ ............................................... F16H 37/00
(52) U.S. Cl. ........................................................ 74/640
(58) Field of Search .............................. 74/640; 477/7; 475/149, 5

(56) References Cited

U.S. PATENT DOCUMENTS

| | | | | |
|---|---|---|---|---|
| 3,128,641 A | * | 4/1964 | Musser | 74/640 |
| 4,784,014 A | * | 11/1988 | Bruns et al. | 74/640 |
| 4,819,975 A | * | 4/1989 | Morishita et al. | 74/640 X |
| 4,951,518 A | * | 8/1990 | Hendershot | 74/640 X |
| 6,089,359 A | * | 7/2000 | Tanaka | 188/162 |
| 6,257,186 B1 | * | 7/2001 | Heer | 123/90.17 |
| 6,258,007 B1 | * | 7/2001 | Kristjansson | 74/640 X |

FOREIGN PATENT DOCUMENTS

| | | | | |
|---|---|---|---|---|
| JP | 60-132166 | | 9/1985 | |
| JP | 1-127349 | | 8/1989 | |
| JP | 403134345 | * | 6/1991 | .................. 74/640 |
| JP | 4-54462 | | 5/1992 | |

* cited by examiner

*Primary Examiner*—Ha Ho
(74) *Attorney, Agent, or Firm*—Westerman, Hattori, Daniels & Adrian, LLP

(57) ABSTRACT

A reduction gears-integrated actuator provided with harmonic reduction gears 14, a motor 7 and a rotation position detector 26, wherein a rotor 11 comprises a cup-shaped rotary yolk 12, a permanent magnet 13 is fixed to the outer periphery of the rotary yolk 12, a circular spline 15 is formed in a silk-hat shape, a flange portion 15a is fixed to one end of an actuator frame 2, and a cylinder portion 15b is disposed opposite to the inner periphery of the rotary yolk 12 via a space, and a cup-shaped housing 18 coupled with an output shaft 5 is disposed between the output shaft 5 and a rotating shaft 6 and on the inner peripheral side of a flexible spline 16, and a preloading elastic member 25 is provided between a rotary shaft 6-supporting bearing 21 and the housing, hence the axial-direction length of the actuator can be reduced, and a driving torque can be increased without compromise in reductions in size and weight, thereby providing a low-cost reduction gears-integrated actuator.

4 Claims, 3 Drawing Sheets

REDUCTION GEARS-INTEGRATED ACTUATOR

BACKGROUND OF THE INVENTION (1) Field of the Invention

The present invention relates to an inexpensive reduction gears-integrated actuator that is capable of shortening the length of the entire actuator in its axial direction and increasing a drive torque without running counter to downsizing and lightening of its weight.

(2) Description of the Related Art

Conventionally, an actuator used for a robot, a machine tool, etc., in which harmonic reduction gears and an electric motor are integrated together is constructed as shown in FIG. 3.

FIG. 3 is a side sectional view of a prior art reduction gears-integrated actuator.

In the drawing, 30 denotes an actuator, 31a denotes a load side bracket, 31b, 31c and 31d denote actuator frames, 31e denotes an anti-load side bracket, 32 denotes an output shaft, 33 denotes a rotation shaft, 34 denotes an electric motor, 35 denotes astator, 36 denotes a stator core, 37 denotes an armature winding, 38 denotes a rotor, 39 denotes a yoke, 40 denotes a permanent magnet, 41 denotes harmonic reduction gears, 42 denotes a circular spline, 43 denotes a flexible spline, 44 denotes a wave generator, 45, 46, 47 48, and 49 denote bearings, 50 and 51 denote elastic members, 52 denotes a rotation position detector, 53 denotes a rotation disk, 54 denotes a fixed slit, 55 denotes alight emitting element, 56 denotes a light receiving element, and $L_o$ indicates a length of the actuator 30 in its axial direction.

Such a reduction gears-integrated actuator 30 has a structure in which the harmonic reduction gears 41, electric motor 34, and rotation position detector 52 are coupled to each other in a series in the axial direction in order from the load side to the anti-load side. Also, these devices are fixed inside hollow cylindrical actuator frames 31b, 31c and 31d, and both end portions are covered by the load side bracket 31a and the anti-load side bracket 31e.

Of these, the harmonic reduction gears 41 are composed of a circular spline 42 which is fixed on the inner circumference of the actuator frame 31b, and at the same time is annular and has inner teeth, the flexible spline 43 which is attached to the inside of the circular spline 42, coupled to an output shaft 32, is cup-shaped and has outer teeth, and an elliptically shaped wave generator 44 which is attached to the inside of the flexible spline 43 via a bearing 47 and coupled to a rotation shaft 33. Also, the bearings 45 and 46 support the output shaft 32 and are given a preload by an elastic member 50. And, the bearings 48 and 49 support the rotation shaft 33 and are given a preload by an elastic member 51.

Further, the electric motor 34 is provided with a rotor 38 composed of a yoke 39 fitted to the rotation shaft 33 and a permanent magnet 40 that becomes a magnetic pole, and at the same time a stator 35 composed of a stator core 36 secured opposite to the outer circumferential side of the rotator 38 via a gap and an armature winding 37 that generates a rotation magnetic field at the stator core 36.

Further, the rotation position detector 52 is composed of an optical type encoder including a rotation disk 53 that becomes a rotation portion fixed at the rotation shaft 33, a fixed slit 54 that becomes a fixing portion of the rotation position detector, which is opposed to the rotation portion, a light emitting element 55, and a light receiving element 56. When light from the light emitting element 55 is projected onto the rotation disk 53, the light receiving element 56 repeats receiving and non-receiving of light via the fixed slit and detects the receiving and non-receiving of light as ON and OFF electric signals. After that, an angle of the rotor is calculated by a calculation circuit (not illustrated).

Next, a description is given of the actions thereof.

When a current flows from a drive circuit (not illustrated) into the armature winding 37 of the stator 35, a drive torque is generated in the permanent magnet 40 of the rotor 38, and the rotor 38 rotates at a high speed by the drive torque. Next, since the wave generator 44 coupled to the rotation shaft 33 of the rotor rotates, the flexible spline 43 is elliptically flexed via the bearing 47 and is engaged with the circular spline 42 at both end positions in the long axis direction of an ellipse in the wave generator 44. At this time, relative rotation is generated between the flexible spline 43 and the circular spline 42, wherein a remarkably reduced rotation force is transmitted from the flexible spline 43 to the output shaft 32 and is outputted therefrom.

However, in the prior art, since the harmonic reduction gears, electric motor and rotation position detector are coupled to each other in a line in a series, the length in the axial direction is made longer especially between the harmonic reduction gears and the electric motor, and between the electric motor and the rotation position detector. Further, the space of the rotation position detector disposed in the axial direction is increased, and this becomes a problem in view of downsizing and lightening of the weight thereof.

Also, since the harmonic reduction gears, electric motor and rotation position detector are, respectively, fixed at three actuator frames, the number of components is increased, resulting in an increase in the number of assembling steps, wherein another problem occurs, resulting in an increase in production costs thereof.

Further, there is a request for improving a torque capacity of an actuator in addition to a request of attempting downsizing and lightening of weight of the actuator. For this reason, it is necessary to make large the outer diameter of the rotor at a position where the permanent magnet thereof is installed, and to increase a drive torque of the rotor. However, in a structure in any of the prior arts, the outer diameter of the stator and actuator frame is increased if the outer diameter of the rotor is increased. Therefore, the cubic volume and weight of the entire electric motor are incidentally increased, and there is a problem which runs counter to the downsizing, lightening of weight and increasing of the torque in an actuator.

The present invention was developed to solve these and other problems, and it is therefore an object of the invention to provide an inexpensive reduction gears-integrated actuator that is capable of shortening the length of the entire actuator in its axial direction and increasing a drive torque without running counter to downsizing and lightening of its weight.

BRIEF SUMMARY OF THE INVENTION

In order to solve the above-described problems, the invention is constructed as described below.

A reduction gears-integrated actuator according to the first aspect of the invention comprises a hollow cylindrical actuator frame; a circular spline that is fixed on the above-described actuator frame and has inner teeth on the inner circumference thereof; a cylindrical flexible spline that has outer teeth engageable with the inner teeth of the above-described circular spline, and has an output shaft of the actuator coupled to the end face thereof; a elliptical wave generator attached on the inner circumference of the above-described flexible spline; a rotation shaft for driving to rotate the above-described wave generator; an electric motor including a rotor provided with a magnetic pole consisting of a permanent magnet and stator provided with an armature winding for generating a rotation magnetic field at a stator core opposed to the outer circumferential side of the above-described rotor via a gap; a rotation portion of a rotation position detector fixed on the above-described rotation shaft; and a fixing portion of the rotation position detector, which is opposed to the rotation portion of the above-described rotation position detector; wherein the above-described rotor constitutes a cup-shaped rotation yoke integrally mounted at the center thereof so as to pass through the above-described rotation shaft, and at the same time fixes the above-described permanent magnet on the outer circumference of the above-described rotation yoke; the above-described circular spline is formed to be like a silk hat and at the same time, the cylindrical portion thereof is disposed so as to oppose the inner circumference of the above-described rotation yoke via a gap while the flange portion is fixed at one end portion of the above-described actuator frame; and the above-described circular spline is further provided, between the above-described output shaft and the above-described rotation shaft, with a cup-shaped housing coupled to the above-described output shaft on the inner circumferential side of the above-described flexible spline, a bearing that is fitted to the inside of the above-described housing and supports the above-described rotation shaft, and an elastic member that is provided in a gap in the axial direction between the above-described housing and the above-described bearing, and gives a preload to the above-described bearing.

Also, the reduction gears-integrated actuator according to the second aspect of the invention is constructed, in addition to the reduction gears-integrated actuator as set forth in the first aspect, so that the rotation portion of the above-described rotation position detector is composed of a disk-shaped magnet for detecting an angle, which is magnetized in a direction perpendicular to the above-described rotation shaft, and the fixing portion of the above-described rotation position detector is composed of a fixed ring provided on the outer circumferential side of the rotation portion of the above-described rotation position detector, and at least two magnetic sensors attached in the circumferential direction of the fixed ring.

Further, the reduction gears-integrated actuator according to the third aspect of the invention comprises a hollow cylindrical actuator frame; a circular spline that is fixed on the above-described actuator frame and has inner teeth on the inner circumference thereof; a cylindrical flexible spline that has outer teeth engageable with the inner teeth of the above-described circular spline, and has an output shaft of the actuator coupled to the end face thereof; a elliptical wave generator attached on the inner circumference of the above-described flexible spline; a rotation shaft for driving to rotate the above-described wave generator; an electric motor including a rotor provided with a magnetic pole consisting of a permanent magnet and stator provided with an armature winding for generating a rotation magnetic field at a stator core opposed to the inner circumferential side of the above-described rotor via a gap; a rotation portion of a rotation position detector fixed on the above-described rotation shaft; and a fixing portion of the rotation position detector, which is opposed to the rotation portion of the above-described rotation position detector; wherein the above-described rotor constitutes a cup-shaped rotation yoke integrally mounted at the center thereof so as to pass through the above-described rotation shaft, and at the same time fixes the above-described permanent magnet on the inner circumference of the above-described rotation yoke; the above-described circular spline is formed to be like a silk hat, and at the same time, the cylindrical portion thereof is disposed so as to be fixed at the inner circumference side of the above-described stator while the flange portion is fixed at one end portion of the above-described actuator frame; and the above-described circular spline is further provided, between the above-described output shaft and the above-described rotation shaft, with a cup-shaped housing coupled to the above-described output shaft on the inner circumferential side of the above-described flexible spline, a bearing that is fitted to the inside of the above-described housing and supports the above-described rotation shaft, and an elastic member that is provided in a gap in the axial direction between the above-described housing and the above-described bearing, and gives a preload to the above-described bearing.

Also, the reduction gears-integrated actuator according to the fourth aspect of the invention is constructed, in addition to the reduction gears-integrated actuator as set forth in the third aspect, so that the rotation portion of the above-described rotation position detector is composed of a disk-shaped magnet for detecting an angle, which is magnetized in a direction perpendicular to the above-described rotation shaft, and the fixing portion of the above-described rotation position detector is composed of a fixed ring provided on the outer circumferential side of the rotation portion of the above-described rotation position detector, and at least two magnetic sensors attached in the circumferential direction of the fixed ring.

DETAILED DESCRIPTION OF THE INVENTION

Hereinafter, a description is given of embodiments of the invention on the basis of the accompanying drawings.

Figure 1:
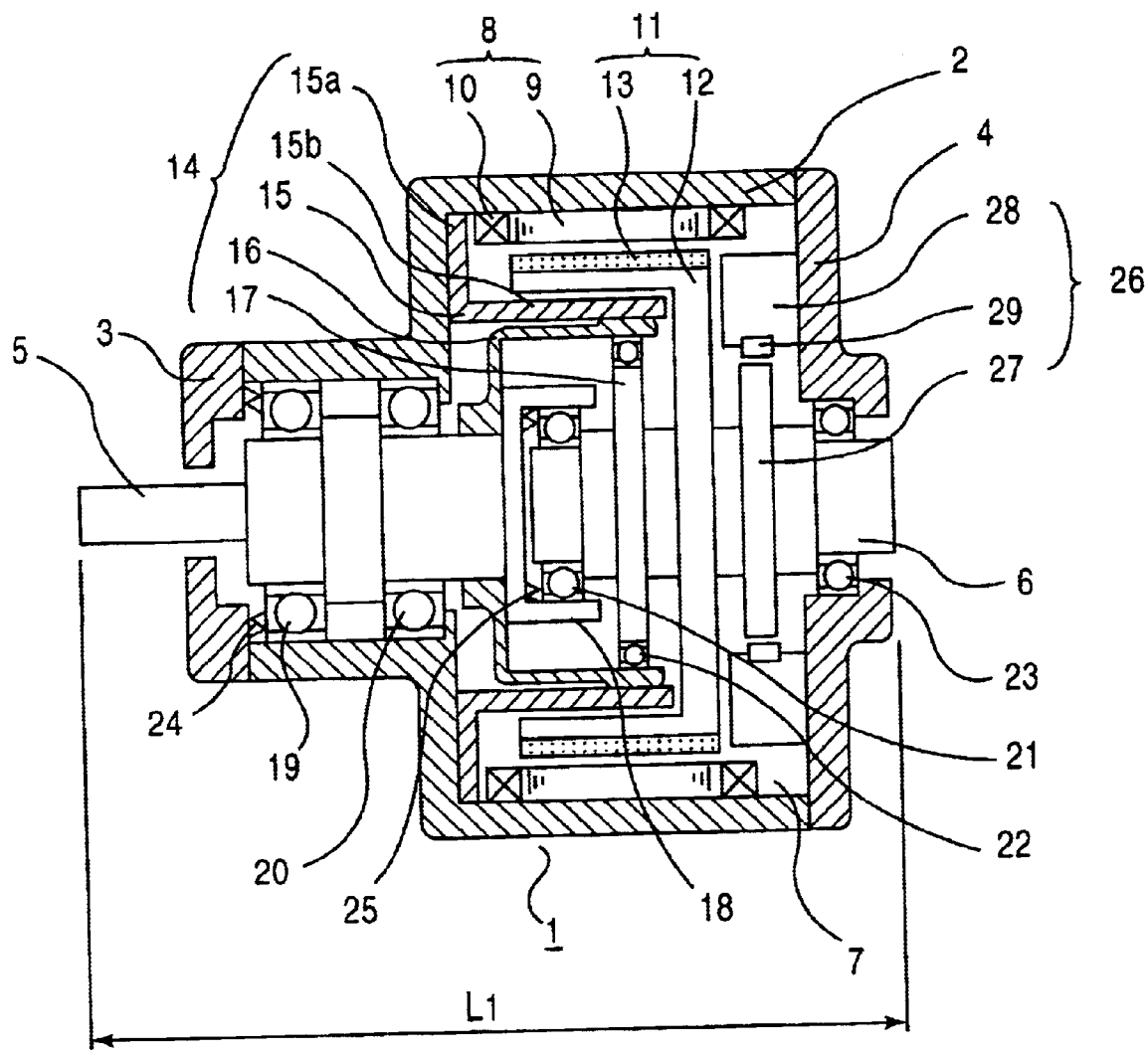
FIG. 1 is a side sectional view of a reduction gears-integrated actuator, which shows a first embodiment of the invention.

FIG. 1 is a side sectional view of a reduction gears-integrated actuator, which shows a first embodiment of the invention.

In the drawing, 1 denotes an actuator, 2 denotes an actuator frame, 3 denotes a load-side bracket, 4 denotes an anti-load side bracket, 5 denotes an output shaft, 6 denotes an rotation shaft, 7 denotes an electric motor, 8 denotes a stator, 9 denotes a stator core, 10 denotes an armature winding, 11 denotes a rotor, 12 denotes a rotation yoke, 13 denotes a permanent magnet, 14 denotes harmonic reduction gears, 15 denotes a circular spline, 16 denotes a flexible spline, 17 denotes a wave generator, 18 denotes a housing, 19, 20, 21, 22 and 23 denote bearings, 24 and 25 denote elastic members, 26 denotes a rotation position detector, 27 denotes an angle detecting magnet, 28 denotes a fixed ring, 29 denotes a magnetic sensor, and $L_1$ indicates a length of the actuator 1 in its axial direction.

The basic constructions of an actuator according to the invention, that is, a construction employing harmonic reduction gears 14, electric motor 7 and rotation position detector 26, and a construction in which the output shaft 5 disposed at the load side is supported by the bearings 19 and 20 and a preload is applied by the elastic member 24 are the same as those of prior arts. However, the present invention differs from the prior arts in the following four points. That is, (1) the rotor 11 is constructed so that a cup-shaped rotation yoke 12 provided so as to pass through the rotation shaft 6 is integrally assembled, and the permanent magnet 13 is fixed on the outer circumference of the rotation yoke 12;

(2) the circular spline 15 is formed to be like a silk hat, the flange portion 15a of the circular spline 15 is fixed at one end part of the actuator frame 2, and the cylindrical portion 15b of the circular spline 15 is disposed so as to be opposed to the inner circumference of the rotation yoke 12 via a gap;

(3) between the output shaft 5 and the rotation shaft 6, a cup-shaped housing 18 coupled to the output shaft 5 is provided on the inner circumferential side of the flexible spline 16, the bearing 21 that supports the rotation shaft 6 is fitted to the rotation shaft 6 in the housing 18, and an elastic member 25 that gives a preload to the bearing 21 is inserted in a gap in the axial direction between the housing 18 and the bearing 21; and (4) a disk-shaped magnet 27 for detecting an angle, which is magnetized in a direction perpendicular to the above-described rotation shaft 6 is provided as a rotation portion of the above-described rotation position detector 26, and a fixed ring 28 is provided on the outer circumferential side of the magnet 27 for detecting an angle as a fixing portion of the above-described rotation position detector 26, and at least two magnetic sensors 29 are attached in the circumferential direction of the fixed ring 28. That is, the rotation position detector is composed of a magnetic type encoder.

Herein, the magnetic sensor 29 of the rotation position detector 26 employs a hole effect element.

In such a construction, since the electric motor 7 and harmonic reduction gears 14 are provided on the inner circumference of the same actuator frame 1, respective spaces conventionally required for the harmonic reduction gears and electric motor to be arranged in series in a line in the axial direction are not required any longer, wherein only a single space is sufficient. Also, since the rotation position detector is disposed in the diametrical direction instead of a conventional one in which the rotation portion and fixing portion are disposed in the axial direction, the space for accommodating the same can be made small, and it is possible to shorten the length of the entire actuator in the axial direction. Therefore, if the length $L_1$ of the actuator in its axial direction in FIG. 1 is compared with the length $L_0$ of the prior art actuator in its axial direction shown in FIG. 3, the length $L_1$ can be shortened by approx. 40%, and this greatly contributes to the downsizing thereof.

Next, a description is given of the actions.

When an electric current flows from a drive circuit (not illustrated) into the armature winding 10 of the stator 8, a drive torque is generated at the permanent magnet 13 of the rotor 11, and the rotor 11 rotates at high speed by the drive torque. Next, since the wave generator 17 which is coupled to the rotation shaft 6 of the rotor is rotated, the flexible spline 16 is flexed to be elliptical via the bearing 22, and is engaged with the circular spline 15 at both end positions in the longer axial direction of an ellipse in the wave generator 17. At this time, relative rotation is generated between the flexible spline 16 and the circular spline 15, wherein a remarkably reduced rotation force is transmitted from the flexible spline 16 to the output shaft 5, and is outputted therefrom. At this time, the magnetic sensor 29 opposed to the magnet 27 for detecting an angle, which is attached to the rotation shaft 6, detects magnetic field positions of the rotating magnet 27 for detecting an angle as electric signals, and the angular position of rotation of the rotation shaft is calculated by a calculation circuit (not illustrated) on the basis of the electric signals.

Next, a description is given of the second embodiment of the invention.

Figure 2:
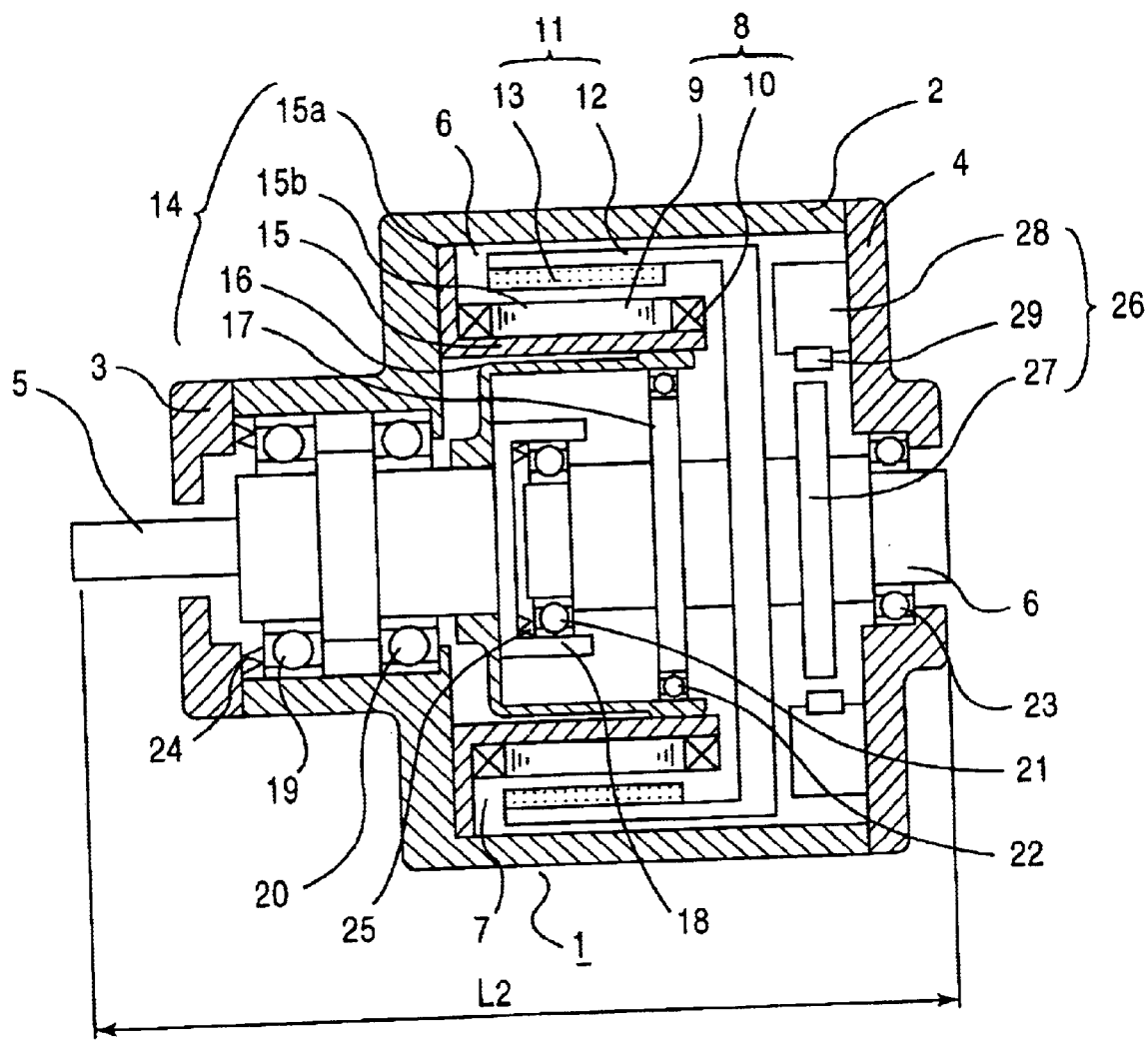
FIG. 2 is a side sectional view of a reduction gears-integrated actuator, which shows a second embodiment a the invention.

FIG. 2 is a side sectional view of a reduction gears-integrated actuator, which shows the second embodiment of the invention. The second embodiment includes components which are similar to those of the first embodiment, and parts which are identical to those in the first embodiment are given the same reference numbers. Also, the housing portion provided between the output shaft of the actuator and the rotation shaft thereof, construction and effects of the rotation position detector are the same as those of the first embodiment, and overlapping description thereof is omitted.

The second embodiment differs from the first embodiment in view of the following two points. That is, (1) the rotor 11 is composed of a cup-shaped rotation yoke 12, the permanent magnet 13 is fixed on the inner circumference of the rotation yoke 12, and the stator 8 is disposed on the inside of the permanent magnet 13 via a gap left therebetween (Outer Rotor System); and (2) the circular spline 15 is formed to be like a silk hat the flange portion 15a is fixed at one end portion of the actuator frame 1, and the cylindrical portion 15b is disposed so as to be opposed to the inner circumference of the rotation yoke 12 via a gap.

Figure 3:
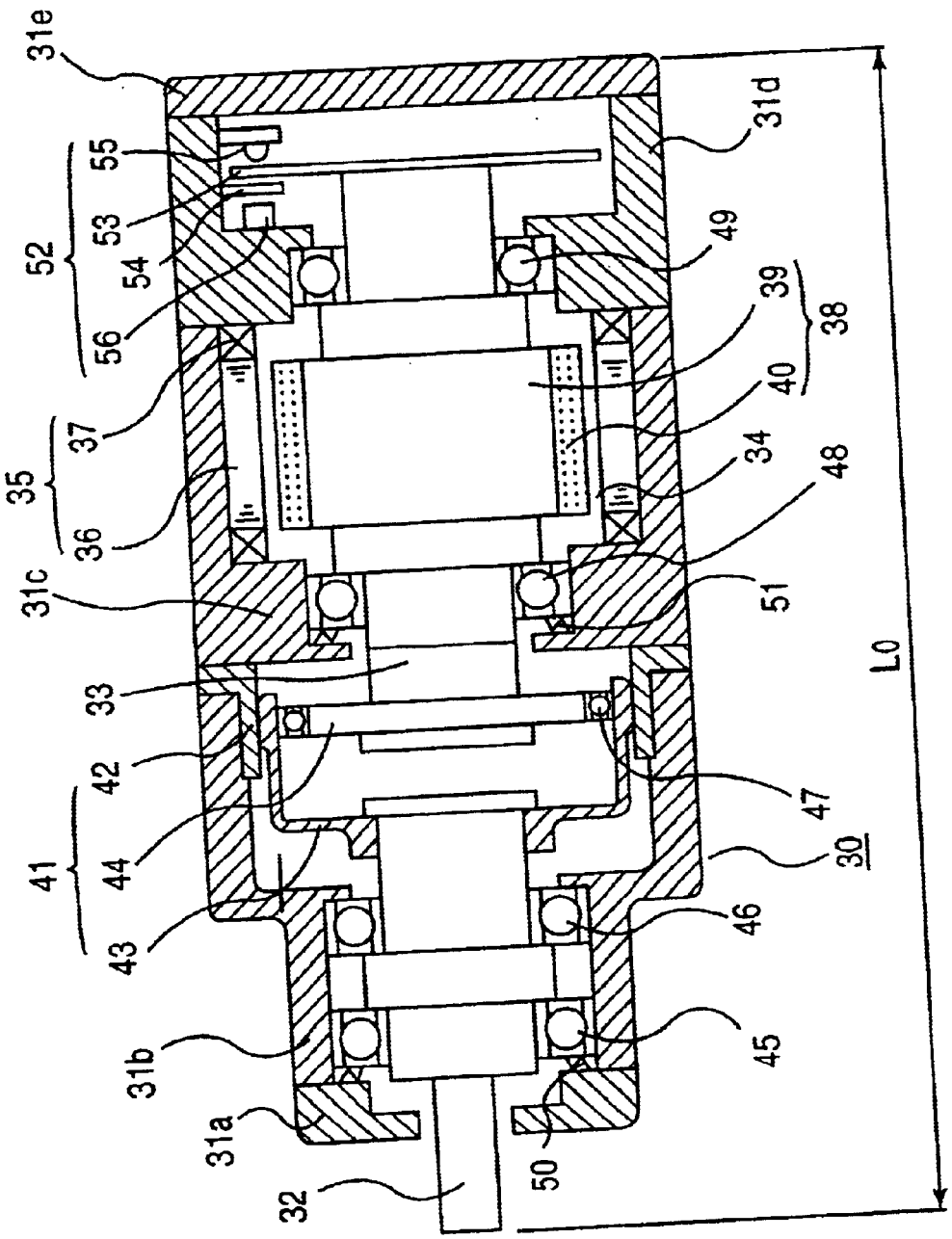
FIG. 3 is a side sectional view showing a prior art reduction gears-integrated actuator.

In such a construction, as in the first embodiment, since the electric motor 7 and harmonic reduction gears 14 are provided on the inner circumference of the same actuator frame 1', it is possible to shorten the length of the entire actuator in its axial direction, whereby if the length $L_2$ of the actuator in the axial direction in FIG. 2 is compared with the length $L_0$ of the prior art actuator shown in FIG. 3 in the axial direction, the length $L_2$ can be shortened by approx. 40%, and this greatly contributes to the downsizing thereof. Also, since actions of the second embodiment are similar to those of the first embodiment, description thereof is omitted.

Therefore, since, in the first embodiment and the second embodiment, the rotation yoke that constitutes the rotor is formed to be cup-shaped, and the harmonic reduction gears are disposed by utilizing a space formed between the inner circumferential side of the cup-shaped rotation yoke and the rotation shaft, and at the same time an electric motor composed of a stator and a rotor is installed on the outer circumferential side of the harmonic reduction gears, the harmonic reduction gears and the electric motor are disposed so that the lengths thereof in the axial direction almost concentrically overlap with respect to the diametrical direction. And, respective spaces conventionally required for connecting the harmonic reduction gears and electric motor in series in the axial direction are not required any longer, wherein only a single space for accommodating these two devices is sufficient, and the electric motor and harmonic reduction gears can be accommodated on the inner circumference of the same actuator frame. Further, since the rotation position detector is disposed in the diametrical direction, it is possible to shorten the length of the entire actuator in its axial direction. Therefore, it is possible to provide a small-sized actuator which is light in weight.

Also, as a result, where the actuator according to the invention is compared with the prior art actuator in which the actuator frame is composed of three components, the number of components can be decreased by one, and this contributes to a decrease in the number of assembling steps, wherein an inexpensive actuator can be proposed.

In addition, since the rotation yoke of the rotor is cup-shaped, the outer diametrical portion of which has a large hollow portion, the weight of the rotor can be decreased to lighten the weight. Therefore, the actuator can be downsized in the axial direction, and even where a high torque is requested, it is possible to increase the drive force without running counter to the downsizing and lightening of the weight.

Also, in the respective embodiments, a description was given of the example of an electric motor, in which an armature winding is provided at the stator side and a magnetic circuit including a permanent magnet is provided at the rotor side. However, the embodiments are not limited to the above-described example, and at least any one of the stator side and the rotor side may be constructed of another magnetic circuit.

In addition, for example, a plate spring, a coil spring, etc., may be used as the elastic member for applying a preload between the bearings. The elastic member is not limited, wherein any means which can substitute the same may be used.

Further, an amorphous wire in which a magnetic resistance element or a magnetic impedance effect is utilized may be used as the magnetic sensor of the rotation position detector, instead of the hole-effect element.

As described above, a reduction gears-integrated actuator according to the invention, in which an electric motor and harmonic reduction gears are integrated can be usefully used in, for example, robots, machine tools, etc.

What is claimed is:

1. A reduction gears-integrated actuator comprising: a hollow cylindrical actuator frame; a circular spline that is fixed on said actuator frame and has inner teeth on the inner circumference thereof; a cylindrical flexible spline that has outer teeth engageable with the inner teeth of said circular spline, and has an output shaft of the actuator coupled to an end face thereof; an elliptical wave generator attached on the inner circumference of said flexible spline; a rotation shaft for driving to rotate said wave generator; and an electric motor including a rotor provided with a magnetic pole consisting of a permanent magnet and a stator provided with an armature winding for generating a rotation magnet field at a stator core opposed to the outer circumferential side of said rotor via a gap; a rotation portion of a rotation position detector fixed on said rotation shaft; and a fixing portion of the rotation position detector, which is opposed to the rotation portion of said rotation position detector;

wherein said rotor constitutes a cup-shaped rotation yoke integrally mounted at a center thereof so as to pass through said rotation shaft, and at the same time fixes said permanent magnet on the outer circumference of said rotation yoke;

said circular spline is formed of a flange portion fixed at one end part of said actuator frame and a cylindrical portion disposed so as to be opposed to the inner circumference of said rotation voke via a gap; and within said circular spline between said output shaft and said rotation shaft is further provided a cup-shaped housing coupled to said output shaft on the inner circumferential side of said flexible spline, a bearing that is fitted to the inside of said housing and supports said rotation shaft and an elastic member that is provided in a gap in the axial direction between said housing and said bearing, and gives a preload to said bearing.

2. The reduction gears-integrated actuator as set forth in claim 1, wherein the rotation portion of said rotation position detector is composed of a disk-shaped magnet for detecting an angle, which is magnetized in a direction perpendicular to said rotation shaft, and the fixing portion of said rotation position detector is composed of a fixed ring provided on the outer circumferential side of the rotation portion of said rotation position detector, and at least two magnetic sensors attached in the circumferential direction of the fixed ring.

3. A reduction gears-integrated actuator comprising: a hollow cylindrical actuator frame; a circular spline that is fixed on said actuator frame and has inner teeth on the inner circumference thereof; a cylindrical flexible spline that has outer teeth engageable with the inner teeth of said circular spline, and has an output shaft of the actuator coupled to an end face thereof; an elliptical wave generator attached on the inner circumference of said flexible spline; a rotation shaft for driving to rotate said wave generator; and an electric motor including a rotor provided with a magnet pole consisting of a permanent magnet and a stator provided with an armature winding for generating a rotation magnet field at a stator core opposed to the inner circumferential side of said rotor via a gap; a rotation portion of a rotation position detector fixed on said rotation shaft; and a fixing portion of the rotation position detector, which is opposed to the rotation portion of said rotation position detector;

wherein said rotor constitutes a cup-shaped rotation yoke integrally mounted at a center thereof so as to pass through said rotation shaft, and at the same time fixes said permanent magnet on the inner circumference of said rotation yoke;

said circular spline is formed of a flange portion fixed at one end part of said actuator frame and a cylindrical portion disposed so as to be opposed to the inner circumference of said rotation voke via a gap; and within said circular spline between said output shaft and said rotation shaft is further provided a cup-shape housing coupled to said output shaft on the inner circumferential side of said flexible spline, a bearing that is fitted to the inside of said housing and supports said rotation shaft, and an elastic member that is provided in a gap in the axial direction between said housing and said bearing, and gives a preload to said bearing.

4. The reduction gears-integrated actuator as set forth in claim 3, wherein the rotation portion of said rotation position detector is composed of a disk-shaped magnet for detecting an angle, which is magnetized in a direction perpendicular to said rotation shaft, and the fixing portion of said rotation position detector is composed of a fixed ring provided on the outer circumferential side of the rotation portion of said rotation position detector, and at least two magnetic sensors attached in the circumferential direction of the fixed ring.

* * * * *